Aug. 11, 1936.   O. B. MISZ   2,050,727
CAISSON BELT APPARATUS AND METHOD
Filed Sept. 19, 1934   3 Sheets—Sheet 1

INVENTOR
Oliver Benjamin Misz
BY
Arthur Yancey
ATTORNEY

Aug. 11, 1936.  O. B. MISZ  2,050,727

CAISSON BELT APPARATUS AND METHOD

Filed Sept. 19, 1934    3 Sheets-Sheet 2

INVENTOR
Oliver Benjamin Misz
BY Arthur Yancey
ATTORNEY

Aug. 11, 1936. O. B. MISZ 2,050,727
CAISSON BELT APPARATUS AND METHOD
Filed Sept. 19, 1934 3 Sheets-Sheet 3
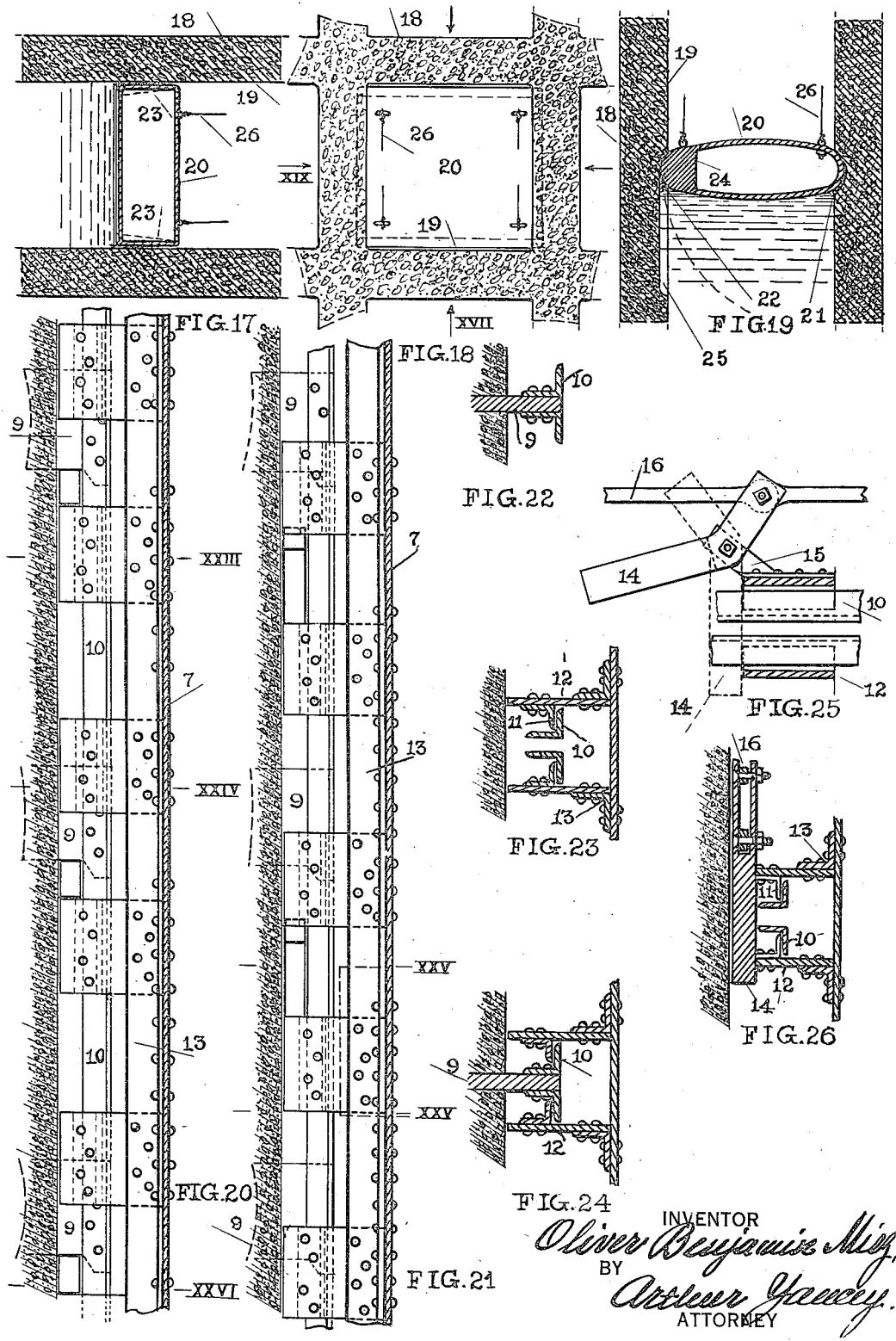

Patented Aug. 11, 1936

2,050,727

UNITED STATES PATENT OFFICE 2,050,727

CAISSON BELT APPARATUS AND METHOD

Oliver Benjamin Misz, New Orleans, La.

Application September 19, 1934, Serial No. 744,622

6 Claims. (Cl. 61—52)

My invention relates to improvements for temporarily floating and progressively lowering constructions to sub-aquatic foundation levels.

One of the objects of the invention is to provide floating equipment which is not to remain in the permanent structure, but is adaptable for re-use.

Another object is to reduce construction costs by eliminating the use of "falseworks", "sand islands", "cofferdams", "retaining walls" and the like, partly or entirely.

Another object is to reduce construction risks by effective control of structure movements during "flotation" and "lowering" operations.

Another object is to shorten construction period by eliminating the use of dry docks, marine railways, and the necessity of work on construction facilities during progress of caisson operations at pier site.

Another object is to provide a well bulkhead, well gate, or false bottom for wells, in basal cellular caissons, that may be released and floated to surface of water within well, then removed for re-use.

The invention is particularly adapted for use during construction of pier caissons in water, by providing floating supports in the form of equipment which does not become a part of the permanent structure, and which may be operated to furnish the necessary upward force to control the flotation and lowering of the structure during all stages of its fabrication from water surface to its permanent foundation level.

However, the invention is also applicable to other uses, such as lowering cofferdams, falsework, retainers for fills, docks and the like.

Broadly speaking, the invention may reside in a plurality of independently operable displacement members, such as tanks, operable as buoys, preferably arranged as a belt surrounding the caisson, each unit of the caisson belt or tank being connected to the caisson, but releasable to free upward or downward movements relatively to the caisson while being held against lateral movement relatively to the caisson.

The said caisson belt may comprise a plurality of tanks having open or capped tops and watertight sides and bottoms, in which water ballast may be used and decreased or increased as desired.

Each tank may be locked to the caisson, or unlocked therefrom to free upward or downward movement relative to the caisson, but always retaining its horizontal or plan position in the belt.

When tanks are coupled to the caisson in the manner above described, the combined displacement of the tanks must provide the uplift necessary to prevent the caisson and tanks from sinking.

The caisson may be lowered by increasing water ballast, or by shifting tanks upward relatively to the caisson, or by fabricating more caisson, or by any combination of these methods.

The caisson may be raised by decreasing water ballast, or by shifting tanks downward relatively to caisson, or by combination of these methods; however, in actual practice it should seldom be necessary to raise caisson.

During the initial fabrication of the caisson, or when the cutting edge section is being formed, the bottom of the tanks should be considerably lower than the cutting edge in order to provide sufficient displacement to support the portion of caisson fabricated with no part submerged.

After continued fabrications, reductions in water ballast of tanks, and shifts of tanks upward relatively to caisson, the cutting edge section, which is the first section of caisson fabricated, will reach the water-bed, but the bottom of the tanks will be above the water-bed at all times.

The next fabrication of caisson, decrease of water ballast in tanks, and shifting of tanks upward relatively to caisson, will result in the lowering of cutting edge into water-bed.

Continued fabrications of caisson and manipulations of tanks as above described will continue to control downward progress of caisson until cutting edge has penetrated water-bed to an independent support.

To induce settlement it will now be necessary to let more water ballast into tanks, continuing to fabricate caisson and make shifts of tanks upward relatively to caisson as required until increased resistance of water-bed prevents further settlement of caisson and tanks will have been ballasted to reduce their buoyancy to a minimum.

For further settlement dredging should now be commenced through open wells after each fabrication and shifting upward of tanks.

If well gates had been installed, they would still be above the water-bed and could be released, the water ballast in tanks should be diminished, as said gates are released, to prevent premature settlement of caisson from loss of the buoyancy furnished by the use of the well gates.

The corner wells should not have well gates installed in them as they should be open to furnish spaces for driving mooring piles into waterbed for holding caisson in position during flotation period at pier site, the well gates when used, used only in the remaining wells.

After gates have been released or, as above described, when no well gates have been used, and the dredging has commenced, it should be time for pulling the mooring piles out so dredging may be carried on in all wells.

Tanks should be shifted upward after each fabrication of caisson and kept in readiness to put in service and produce desired uplift on caisson at any time caisson is starting to settle too quickly or to list account of cutting edge having entered a strata of softer material or un-uniform density.

When dangers of excessive settlement and listing are past, tanks may be released for use elsewhere.

The invention provides for shifting the tanks upward or downward relatively to the caisson when desired. As above stated, in the early stages of operation the floating tanks forming the "belt" should project a considerable distance below the cutting edge section of caisson, their depths of flotation being controlled mostly by decreasing or increasing their water ballast. As successive shifting of tanks upward relatively to caisson and fabrication of caisson continues, the floating depths of the tanks will not be changed materially if tanks were fabricated or assembled, to full lengths during first stages of flotation. Therefore, when cutting edge of caisson is entering water-bed, the bottom of floating tanks will be well above cutting edge and free to operate as before while caisson penetrates water-bed.

The invention provides, for each tank, apparatus for connecting or disconnecting tank and structure at equal vertical intervals, and for vertical guides which connect each tank to structure at all times.

The connections above mentioned, which are at equal vertical intervals, are to prevent downward motion of structure relatively to the tank.

The connections above mentioned, which connect each tank to structure at all times, are to prevent lateral movement of tank relatively to structure, other than the slight freedom of movement necessary to assure free vertical movements of tank relatively to caisson.

When a tank is to be shifted for vertical position relatively to caisson, it must be put out of service, for upward pressure on structure before disconnection may be made. This may be accomplished by increasing water ballast in tank, then, by manipulating water ballast, tank may be lowered or raised to desired level and re-connected to structure, and by reduction in water ballast, the required uplift on structure may be produced.

Obviously, shifting a single tank at a time would cause undesirable list of structure and tanks during that operation. Therefore, the shifting operation should include two or four tanks at a time, those tanks being chosen so as to cause no undesirable listing of structure when those operations are being made.

It will be understood that while any tanks are out of service in producing their proportion of uplift on structure, the structure will have taken a lower floating position, as those tanks in service must provide the displacement that was supplied by the total number of tanks before shifting operations were commenced. The difference in floating position which would result from shifting of tanks can be readily calculated, and it can be determined whether it would be desirable to shift two or four tanks at a time.

In the beginning of any project, it will most probably be necessary to fabricate the first section or sections of structure on a temporary support inside of floating belt of tanks, or a temporary pile dock, in which cases the tanks along two sides of the belt or tanks which would interfere with releasement of temporary support, may be left out of the belt until support has been dispensed with, by towing it out from under structure, or in case of the temporary support being a dock, by towing structure and tanks away from it.

It should be understood that tanks may be assembled for their entire length, which length can be calculated for any given condition at structure site, floating them in any desired vertical position by using water ballast, assemble along the sides of the temporary support which is to contribute to the support of the structure during fabrication of its first section or sections and, as above described, fabricate and lower the structure in any available place in vicinity of project's site that may be preferable. When structure has reached a depth in water such that it, together with tanks, may be towed to structure's site, leaving fewest possible operations necessary to lower it into water-bed, the structure may be floated to correct position and mooring piles driven through corner wells into water-bed.

The removable well gates or bulkheads, above mentioned and hereinafter described, may be used to advantage to increase displacement within area of structure, thereby allowing a less displacement to be provided by tanks in many cases. However, the same result may be attained by using tanks in well openings as well as in surrounding belt and operating them in the same manner as for above described tanks which form the belt.

The type of well gate described and illustrated in this application is adaptable for release and re-use. In very shallow water it cannot function for the reason that it would be necessary to install it at or too near the cutting edge, in which case it would have to be kept in well until the cutting edge entered water-bed, under which condition this type of gate could not be released without destroying it.

For better illustration and disclosure, one form of the invention and its operation is described in detail and the invention is succinctly defined in the claims. The form used for illustrating the invention includes barges to furnish the initial support for fabrication of cutting edge portion of structure, and shows fabrication of tank units progressing in line with fabrication of structure, also showing use of well gates which should not be used generally unless conditions allow of same being installed well above lower end of structure.

It should be made plain that this invention does not intend to include use of any well gates or bulkheads, but the use of well gates that can be taken out before touching water-bed, made possible by use of belt flotation system only, and the type of well gate best adapted for re-use, are intended to form features of this invention.

In the drawings:

Fig. 17 is an enlarged detail cross section of part of one of the pier wells showing the gate and closure indicated by the arrow XVII, Fig. 18.

Fig. 18 is a plan view of one of the well gates and well, broken lines showing recesses in the concrete in opposite walls to provide seats and seals for the gate. Other broken lines show inclined sides of the gate to provide wedge shaped calking of the gate on the unrecessed walls.

Fig. 19 is a longitudinal section of part of one of the wells and gate, indicated by the arrow XIX, Fig. 18, showing recesses in opposite walls to provide sealing seats for the gate; and, also an elongation of one of the recesses for freeway to swing the gate to install or to remove it.

Fig. 20 is an enlarged detail showing part of the belt units in section and showing a side view of the slidable and locking connection of the belt unit to the pier The belt unit is here shown as connected to the pier, and locked and slidably immovable up and down in the guides.

Fig. 21 shows the same as Fig. 20, except that the belt unit is here shown as being unlocked, the unit having been first shifted downward to provide freeway for swinging the locks, after which the units are free to move up and down in the guides, though connected to the pier.

Fig. 22 is a detail section of the concrete of the pier and part of one of the members coupling the buoyant units to the pier, showing the concrete and coupling only. This is preferably set partly in the concrete and is provided with flanges that slidingly engage corresponding guides secured to the belt units.

Fig. 23 shows a detail section of concrete of the pier and coupling members, complementary to those above described, that are secured to the belt units, section XXIII, Fig. 20.

Fig. 24 shows the subjects of Figs. 22 and 23 in engagement, section XXIV, Fig. 20.

Fig. 25 is a section and view in detail, XXV, Fig. 21, parallel to the pier, showing in section parts secured to the belt units; and showing in view the slidably engaging angles and lock, the latter being shown in full lines as open and in broken lines as closed.

Fig. 26 is a section, XXVI, Fig. 20 showing the belt unit locked. It will be understood that the lock or bar, when closed, is positioned between the pier member of the coupling and the plates and angles of the complementary belt members of the coupling and that the buoyancy of the belt units, when locked to the pier, hefts against the pier member of the coupling and the pier.

Figure 1:
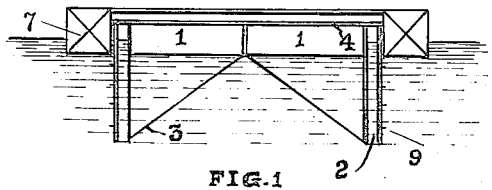
Fig. 1 is a sectional elevation showing a floating support comprising a pair of barges, deck beams, units of one section of the caisson belt, and stayed, depending members initially providing for coupling and shifting the belt units.

1 is any suitable floating support such as a barge, scow or the like, having decks hatched, and calked water-tight. This is used in the initial construction only of the pier. 2 shows one of a plurality of members secured to and depending from the barge to support couplings for the belt units. These members are also used in the preliminary construction only of the pier. 3 is one of a number of stays supporting the aforesaid depending members. The deck beams 4 co-operate with members 5 and 6 to support concrete forms for the first pourings. The bottom sections 7 are open at the top and closed at the bottom. The other sections 8 are open top and bottom. The belt units comprise built-up sections with side joints hermetically sealed and closed bottoms. 9–16, inclusive, show details of the couplings. These co-operate to releasably connect the initial support or, later, the pier and belt units, enabling the belt units to freely slide vertically up or down in the guides but capable of being locked therein at different levels or depths, Figs. 22–26. 9 is the pier member of the coupling preferably partly set in the concrete.

The flanges 10 connect the aforesaid pier members forming continuous guides, preferably, mating with guides 11 secured by the plates 12 and angles 13 to the belt units, see Fig. 23. These, as aforesaid, co-operate to form telescoping guides connecting the belt units to the pier, but permit the units to freely float independently of the pier and to be shifted vertically up or down in the guides as shown in Fig. 24. However, the units may be locked at different levels by throwing the bar or lock 14, pivotally mounted on the bracket 15, across the plates as shown in Figs. 25 and 26. In Fig. 25, the lock is shown as opened by full lines, and as shut by broken lines. The locks may be collectively operable by the rod 16.

The forms are used, 17, for pouring the concrete. 18 is the pier. The pier wells 19 are hermetically sealed by the gates 20. Opposite ends of the gates are sealed and seated in like walls of the wells, recesses 21 and 22 being formed in the walls to provide seats and sealing zones for the gate ends. Sides of the gates may be shaped to incline to the unrecessed walls of the wells to provide wedge shaped calking joints indicated by the broken lines 23, Fig. 17. The gates may be constructed of wood or metal. If wood is used, the preferred form is that of a truncated pyramid to provide wedge shaped calking joints. If metal is used, the preferred form, as shown, is a hollow shell of approximately elliptical longitudinal section and preferably of trapeziform cross section. One of the gate ends is weighted, 24, to cause the gate when being removed to float uprightly. One of the aforesaid recesses is elongated downward to provide clearance for the weighted end of the gate to sink, thereby bringing the gate into a vertical position, see 25. The width of the gate being less than that of the well, the gate should then float through the well to the surface. Cables 26 are provided to haul the gates to the surface in the event of fouling.

It may be preferable to use a plurality of superposed gates to regulate buoyancy or to assure sealing of the wells; or to use no gates at all, arranging belt units of suitable dimensions to operate in the wells in substantially the same way as they may be used outside.

Figure 2:
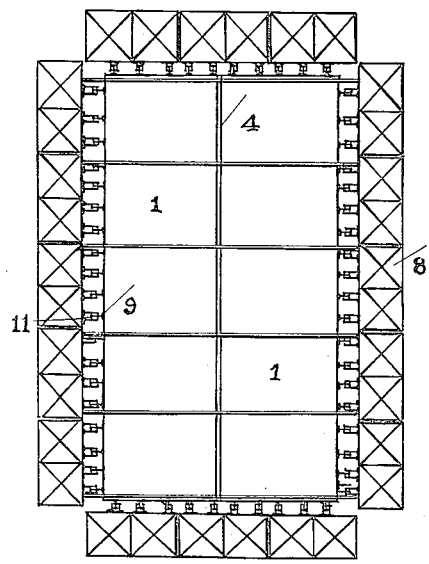
Fig. 2 is a plan of parts shown in Fig. 1 with dimensions of the coupling members exaggerated relatively to those of the belt sections for clearer illustration.
Figure 4:
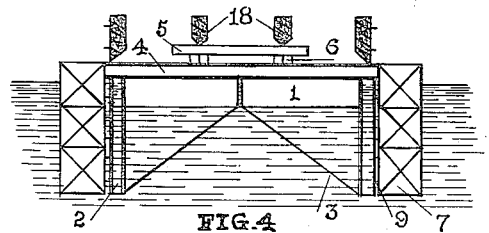
Fig. 4 is an elevation showing the third section added to the belt units and the units as having been shifted downward another section, also the first pour of concrete, beginning the pier.
Figure 5:
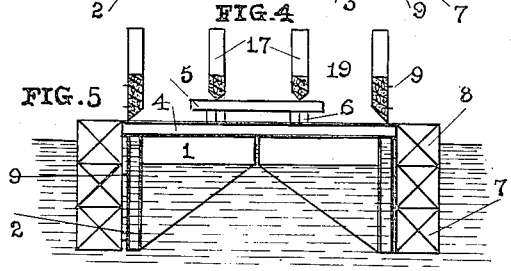
Fig. 5 is an elevation showing forms set for the second pour of concrete.
Figure 8:
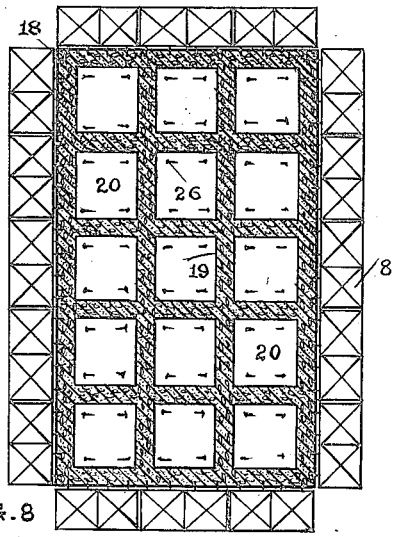
Fig. 8 is a plan view showing the concrete poured, the caisson belt coupled and all of the pier wells gated and sealed.

For the demonstrative operation: barges 1 are positioned and moored. Temporary depending supports 2 are arranged to carry the belt sections, see Fig. 1. Then the bottom sections 7 are connected as shown in Fig. 1 and Fig. 2, the couplings 11 on the belt sections being made to telescope the couplings 9 on members 2. The belt units will now freely ride in the guides, floating but imparting no heft to the barges. Next, add a section to the belt units, then sink and lock the units, see Figs. 20, 25, 26 so that the top of the belt section 8 is about level with the barge deck. Buoyancy of the belt units now hefts the barges. The belt units may be adjusted to the desired vertical position by "watering or unwatering" the belt units, or by weighting the units, or by tower and tackle. Then arrange the deck beams 4 and the supports 5 and 6 and set up forms 17 for the first pour of concrete, forming the "cutting edge" and beginning the pier. Insert the desired inset part of couplings 9 through openings in the forms prepared therefor. Next, add another section to the belt units, unlock as above described, sink and lock the units so the top of the third section is substantially level to the deck of the barge, then make the first pour of concrete, see Fig. 4.

Figure 6:
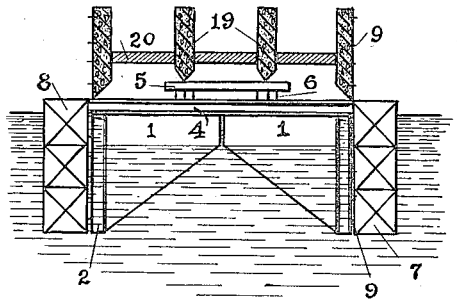
Fig. 6 shows the second pour of concrete and gates installed to hermetically seal the pier wells.
Figure 7:
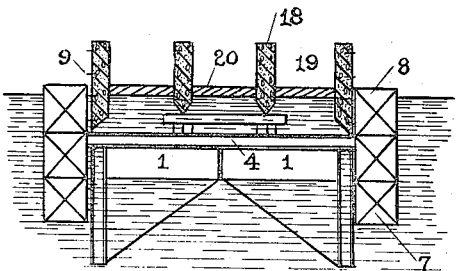
Fig. 7 shows the belt units as having been unlocked, shifted one section upward and locked again.
Figure 3:
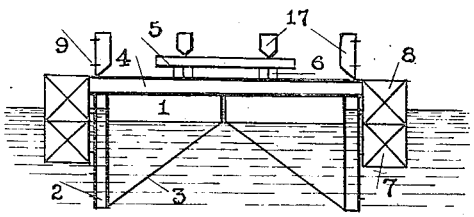
Fig. 3 is an elevation showing the second section added to the belt units and the belt shifted to operate one section downward or deeper, also the set up of the first section of concrete forms providing sharp edges at the bottom for cutting through the water bed.
Figure 9:
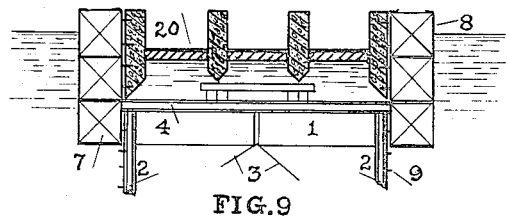
Fig. 9 is an elevation showing belt units of three sections as having been shifted upward one section and locked again.

After the concrete is tamped and set, extend forms for the second pour of concrete and insert the couplings as above described. Then install and calk the well gates 20, see Figs. 17, 18 and 19, which should be sealed and water tight. Then make the second pour of concrete, Fig. 6. Then unlock the units, shift upward one section and lock, Fig. 7. Again unlock the units, shift upward one section and lock, Fig. 9.

Figure 14:
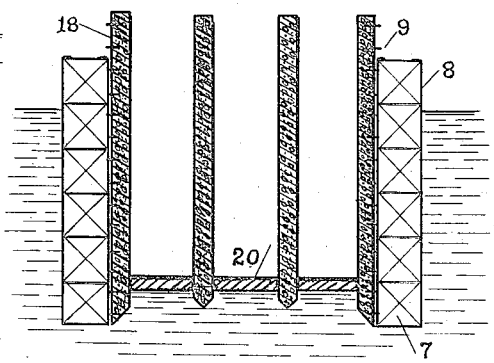
Fig. 14 shows the seventh pour of concrete and the cutting edge of the pier as approaching the water bed.
Figure 10:
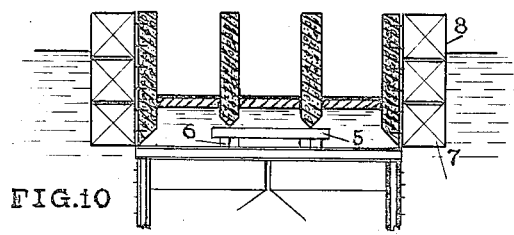
Fig. 10 shows the third pour of concrete and belt units as having been unlocked, shifted upward one section and locked again.
Figure 11:
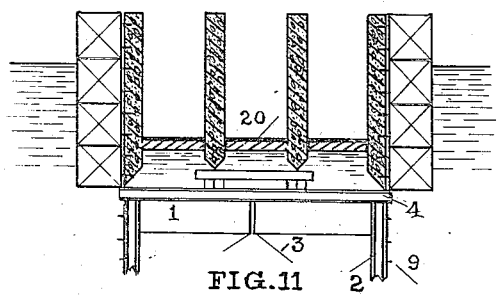
Fig. 11 shows the fourth pour of concrete and the fourth section added to the belt units.
Figure 15:
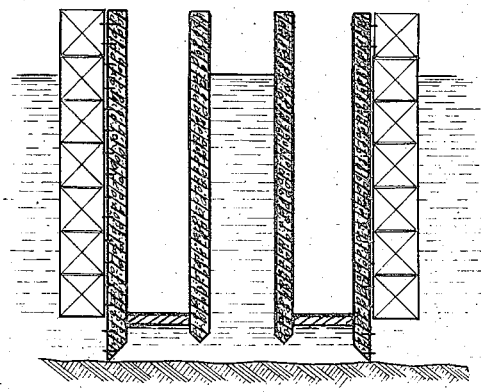
Fig. 15 shows the eighth pour of concrete, the addition of the seventh section to the belt units, and the belt units as having been unlocked and shifted upward one section, center wells flooded and gates removed, and the cutting edge of the pier as in contact with the water bed.
Figure 12:
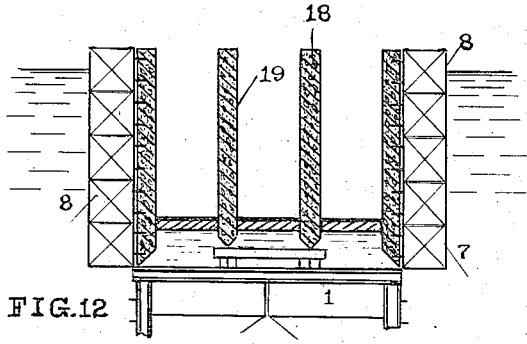
Fig. 12 shows the fifth pour of concrete and the fifth section added to the belt units.
Figure 16:
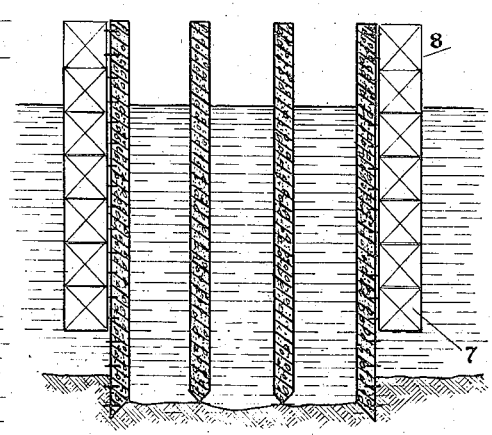
Fig. 16 shows belt units of seven sections as having been unlocked, shifted upward one section and locked again, the ninth pour of concrete, side wells flooded, ungated and gates removed; and, dredging of the water bed under way.
Figure 13:
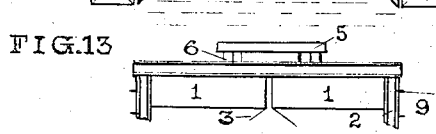
Fig. 13 shows the sixth pour of concrete and the sixth section added to the belt units, the barges flooded, disconnected and removed, the pier being now floated by the caisson belt and buoyancy of the sealed wells only.

Next, shift forms, insert couplings and make the third pour of concrete. Unlock the belt units, shift upward one section and lock, Fig. 10. Shift forms and insert the couplings, add another section to the belt units and make the fourth pour of concrete, Fig. 11. Again shift forms and insert couplings, add section to the belt units and make the fifth pour of concrete, Fig. 12. It will be understood that during the foregoing operations, and as well the later, that desired freeboards are maintained by "watering and unwatering" the belt units. Next, again shift forms and inset couplings, add another section to the belt units and make the sixth pour of concrete. Then flood and remove barges 1, remove supports 2, 3, 4, 5 and 6, Fig. 13. Again shift forms, inset couplings and make the seventh pour of concrete, Fig. 14. The cutting edge of the pier now approaches the water bed. Then shift forms and inset couplings and make the eighth pour of concrete. Add another section to the belt units, unlock, shift upward one section and lock again. Flood center wells and remove gates. The gates, being less in width than the wells, after swinging to a vertical position, seals being broken, should float to the surface. In the event of fouling, cables 26 may be used to haul the gates to the surface. The cutting edge of the pier now reaches the water-bed, Fig. 15. Then shift forms and inset couplings, unlock belt units, shift upward one section and lock; make the ninth pour of concrete. Flood the side pier wells, remove gates and excavate the water-bed through the well, Fig. 16.

Shifting the belt units should continue as above described until danger of listing the pier is passed. If the pier should list when sinking in the water bed, it may be compensated by "watering and unwatering" the belt units when and where required. When danger of listing is passed, the belt units may be removed as the excavation and sinking continues.

I claim the following combinations and other combinations that may be equivalent to these:

1. The method of lowering the basal portion of a concrete caisson to sub-aquatic levels which includes mooring a temporary floating support, fabricating the lower portion of the caisson on said support, arranging thereabout a plurality of floating water ballasted tanks, connecting said tanks each releasably and independently to said caisson portion, reducing the water-ballast in the tanks until the combined buoyancy thereof is capable of independently holding said caisson portion afloat, then submerging and removing the temporary support; progressively further fabricating and lowering the said caisson portion controlling the sub-aquatic progress thereof by manipulating the water-ballast in the tanks, intermittently shifting the tanks vertically to connect with the caisson portion at different levels relatively thereto until the base of the caisson will have reached the water-bed and penetrated the ground therebelow to an independent support; then releasing and removing the tanks for re-use.

2. The method of lowering structure to sub-aquatic levels which includes mooring a temporary floating support, fabricating the basal portion of structure on said support, arranging thereabout a plurality of water-ballasted floating tanks, releasably and independently connecting each of the tanks to the structure, reducing the water-ballast in the tanks until the combined buoyancy of the tanks is independently capable of sustaining said structure afloat; then submerging and removing the temporary floating support, further fabricating and lowering the structure, controlling its sub-aquatic progress by manipulating the water ballast in the tanks until said basal portion of structure will have reached the water-bed and sunk therein to stable support, then removing the tanks.

3. Apparatus for progressively lowering structure to sub-aquatic levels including in combination a plurality of independently floating supports and a plurality of connectors, said supports adapted to being releasably connected to the structure and to extend below the base thereof when said base is near the surface of the water, and to being released, vertically shifted and reconnected to the structure to position entirely above the water-bed when the base of the structure will have been lowered thereto and sunk in the ground therebelow to a stable support.

4. Apparatus for progressively lowering structure to sub-aquatic levels including in combination a plurality of independently floating supports arranged peripherally of the structure in belt form and a plurality of releasable connectors holding said supports against substantial horizontal movement while releasable to vertical movement and re-connection relatively to the structure.

5. The method of fabricating and progressively lowering to sub-aquatic levels temporarily floated structure, which includes releasably connecting to said structure a plurality of water-ballasted independently floating tanks, disposing the bottom of each of the tanks above the base of the structure, extending the structure and tanks upward section over section and controlling submergence of part of the structure by manipulating the water-ballast in the tanks, thereby maintaining above water part of structure for fabrication and providing freeway for removal of the tanks for re-use after the submerged part will have reached the water-bed and the base of structure sunk to stable support.

6. A caisson of cellular type including in combination a cell, a bulkhead and a bulkhead seat comprising a recess in each of opposite parts of the cell wall, the other parts of the cell wall adjacent to the bulkhead seal being un-recessed; whereby, seal of the bulkhead being broken and the bulkhead longitudinally inclined, it may be caused to traverse the recesses, raised to the surface of the water and removed from the cell, intact for re-use.

OLIVER BENJAMIN MISZ.